Figure 2:
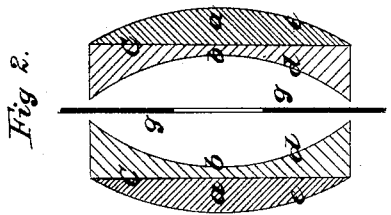

(No Model.)

H. L. H. SCHRÖDER.
APLANATIC LENS.

No. 404,506. Patented June 4, 1889.

Inventor,
Heinrich L. H. Schroder
by
A. Pollok
his attorney

Witnesses
Philip Mauro
Charles J. Hedrick

UNITED STATES PATENT OFFICE.

HEINRICH LUDWIG HUGO SCHRÖDER, OF 17 ALTHORP ROAD, UPPER TOOTING, COUNTY OF SURREY, ASSIGNOR TO JOHN STUART, OF CLAPHAM, COUNTY OF SURREY, ENGLAND.

APLANATIC LENS.

SPECIFICATION forming part of Letters Patent No. 404,506, dated June 4, 1889.

Application filed March 13, 1889. Serial No. 303,139. (No model.) Patented in England April 7, 1888, No. 5,194.

*To all whom it may concern:*

Be it known that I, HEINRICH LUDWIG HUGO SCHRÖDER, optician, a subject of the Queen of Great Britain and Ireland, and residing at 17 Althorp Road, Upper Tooting, in the County of Surrey, England, have invented certain Improvements in Lenses, (for which I have obtained a patent in Great Britain, No. 5,194, dated 7th day of April, 1888,) of which the following is a specification.

This invention has for its object to provide a lens in which the errors of curvature of the image and color correction incident to other lenses are overcome and this over a large field of view. Lenses made according to this invention give a sharply-defined image throughout the field, which is of great advantage in most or all applications of lenses, and especially so for photographic and other like purposes. Hitherto all achromatic lenses (having either flat or other contact surfaces) that give a positive image have the convex radius shorter than the concave radius.

Now, the distinctive feature of the lens, according to this invention, is that by employing glasses, combined as hereinafter described, the radius of the convex surface is enabled to be longer than that of the concave surface and at the same time a positive image is still obtained. The convex and concave surfaces may thus be arranged to represent parts of two concentric spheres.

According to this invention the objective is composed of a plano-convex lens made of glass, of a high refractive power and relatively-low dispersive power, combined with a plano-concave lens made of a glass of lower refractive power than that of the glass of the plano-convex lens, but of the same or higher dispersive power than that of the glass of the said plano-convex lens. The inner or contact surfaces of these two lenses are placed together and preferably cemented, the plano-convex lens forming the front portion of the objective. By proper choice of the radii of the spherical surfaces of the lenses and of the glasses used and of their thicknesses, an aplanatic lens can be made having a positive focus—that is, a lens giving a real image of an object receivable on a screen and having great flatness of field and suitable color correction throughout a considerable angular distance from the axis. The ratio of the radii of the two concentric spherical surfaces will depend upon the refractive powers and dispersive powers of the glasses used, as hereinafter more fully explained.

And in order that the said invention may be fully understood, I will now proceed more particularly to describe the same, and for that purpose shall refer to the accompanying drawings.

Figure 1:
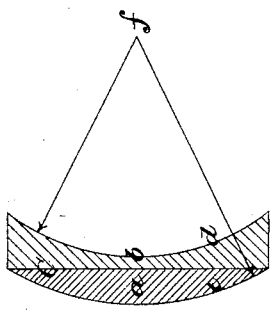

Figure 1 is a transverse section of an objective made according to this invention, $a$ being the plano-convex lens of high refractive and low dispersive power, and $b$ being the plano-concave lens of lower refractive power and the same or higher dispersive power.
Fig. 2 represents a pair of objectives with a diaphragm between them.

The convex and concave external surfaces (marked, respectively, $e$ and $d$) are portions of concentric or approximately concentric spheres having their center at $f$, and the plane internal surfaces are preferably cemented together at $c$.

In order to obtain a plane image throughout a large field of view, the radii of the external surfaces ($e$ and $d$) should have a certain ratio to each other dependent on the refractive and dispersive powers of the glasses used.

In practice it is found that the limits of the refractive powers of glass available for the front lenses of the improved objective are from about 1.59 to about 1.61, the index being taken to be corresponding to the D-line of the spectrum. Similarly the range of refractive powers for the glasses available, for the back lens of the said objective ranges from about 1.50 to about 1.53, the refractive index being, as before, that for the D-line of the spectrum. It is to be understood that these figures are given as being what are considered the best with glass as now generably obtainable.

With the before-named glasses the ratio of the refractive and dispersive powers which would produce the best radii, so far as flatness of field and suitable color correction of the image are concerned, is given by the following tables:

Table No. 1.

| Dn=index of refraction relating to the plano-convex lens. | | | DN=index of refraction relating to the plano-concave lens. |
|---|---|---|---|
| 1.59 | 1.60 | 1.61 | |
| 0.916 | 0.904 | 0.891 | 1.53 |
| 0.903 | 0.890 | 0.877 | 1.52 |
| 0.889 | 0.876 | 0.864 | 1.51 |
| 0.875 | 0.863 | 0.851 | 1.50 |

(Dispersive ratio = $w$.)

Table No. 2.

Ratio of the concentric curves = $\rho$.

Dn=1.59.

| DN | $w$ | $\rho$ |
|---|---|---|
| 1.53 | 0.916 | 1.072 |
| 1.52 | 0.903 | 1.086 |
| 1.51 | 0.889 | 1.100 |
| 1.50 | 0.875 | 1.115 |

Dn=1.60.

| DN | $w$ | $\rho$ |
|---|---|---|
| 1.53 | 0.904 | 1.083 |
| 1.52 | 0.890 | 1.097 |
| 1.51 | 0.876 | 1.112 |
| 1.50 | 0.863 | 1.126 |

Dn=1.61.

| DN | $w$ | $\rho$ |
|---|---|---|
| 1.53 | 0.891 | 1.094 |
| 1.52 | 0.877 | 1.109 |
| 1.51 | 0.864 | 1.123 |
| 1.50 | 0.851 | 1.138 |

Thus, for example, if the front or plano-convex lens $a$ have a refractive power of 1.61 for the line D in the spectrum and the back or plano-concave lens have a refractive power for the same line of 1.50, the ratio of the curves of the two spherical surfaces of the lenses ($e$ and $d$) should be 1.138, in order that throughout the field of view the image may be plane with suitable color correction.

Slight deviations may be made from the directions given above—as, for example, by slightly departing from the plane internal surfaces $c$, or from the concentricity of the external spherical surfaces $e$ and $d$, or from the ratio of the radii or dispersive and refractive powers of the two glasses $a$ and $b$, given by the above tables—without departing from this invention; but I believe that by following the rules given above the best results will be obtained with glass at present obtainable. With the aid of these tables the requisite ratios of the dispersive power to the refractive powers of the glasses used, and also the requisite ratios of the radii of the curved surfaces of the lenses, may be calculated by the ordinary method of interpolation. The objectives may be used singly, as in Fig. 1, or combined, as in Fig. 2, ($g$ being the diaphragm between them.)

Having now particularly described and ascertained the nature of the said invention and in what manner the same is to be performed, I declare that what I claim is—

1. An aplanatic lens composed of a plano-convex lens and a plano-concave lens joined together, the convex surface of the lens having a longer radius than that of the concave surface, substantially as described.

2. An aplanatic lens or objective giving a positive image, said lens or objective being composed of a plano-convex lens made of high refractive power and low dispersive power, and a plano-concave lens made of glass of lower refractive power and as high or higher dispersive power, the convex surface of said lens or objective having a longer radius than the concave surface, substantially as described.

In testimony whereof I have signed my name to this specification in the presence of two subscribing witnesses.

HEINRICH LUDWIG HUGO SCHRÖDER.

Witnesses:
 HERBERT S. HEYBURN,
  15 *Upper Montagu St., London, W.*
 JNO. MILLER,
  51 *Union Road, Clapham, London, S. W.*